United States Patent
Lee

[11] Patent Number: 5,945,795
[45] Date of Patent: Aug. 31, 1999

[54] ELECTRIC MEANS FOR DRIVING SINGLE-COIL MOTOR

[76] Inventor: Vincent Lee, No. 148, Tai-Ho Road, Chupei City, Hsinchu Hsien, Taiwan, 302

[21] Appl. No.: 09/093,873

[22] Filed: Jun. 9, 1998

[51] Int. Cl.⁶ ....................................................... H02P 6/08
[52] U.S. Cl. ............................................. 318/254; 318/721
[58] Field of Search ................................... 318/138, 254, 318/439, 700, 720, 721, 722

[56] References Cited

U.S. PATENT DOCUMENTS

| | | | |
|---|---|---|---|
| 4,270,076 | 5/1981 | Nygaard | 318/254 |
| 4,379,984 | 4/1983 | Muller | 318/254 |
| 4,535,275 | 8/1985 | Muller | 318/254 |
| 4,542,323 | 9/1985 | Doemen | 318/254 |
| 4,563,622 | 1/1986 | Deavers et al. | 318/254 |
| 4,626,751 | 12/1986 | Doemen | 318/254 |
| 4,701,683 | 10/1987 | Kikkawa | 318/254 |
| 5,349,275 | 9/1994 | Muller | 318/254 |

*Primary Examiner*—Bentsu Ro
*Attorney, Agent, or Firm*—Smith, Gambrell & Russell, LLP; Beveridge, DeGrandi, Weilacher & Young Intellectual Property Group

[57] ABSTRACT

This invention is to provide an electric means for driving a single-coil motor, which includes three diodes, a capacitor, and a coil-drive integrated circuit. The electric means of the invention is simple and compact, and it costs lower. Since there is only one coil in the single-coil motor, it is noiseless. In addition, the electric means of the invention can absorb the sudden peak of the voltage induced by the coil of the sinqle-coil motor.

3 Claims, 3 Drawing Sheets

ELECTRIC MEANS FOR DRIVING SINGLE-COIL MOTOR

BACKGROUND OF THE INVENTION

1. Field of the Invention

The invention relates to an electric means for driving a motor, especially to an electric means with simpler and compact circuitry for driving a single-coil motor.

2. Background of the Invention

Double-coil motor has been greatly used for driving the fan of an electric fan. FIG. 1 shows an electric means of the prior art for driving a double-coil motor. In FIG. 1, the electric means for driving double-coil motor includes a diode 1, a sensor 2, a resistor 3, and a switching circuit 4. The coils 5 denote both coils of the double-coil motor. The positive terminal of the diode 1 is connected with the positive output port of a DC power source, and the other terminal of the diode 1 is linked to one end of the resistor 3, the power input of the sensor 2, and one terminal of each coil 5. The other end of the resistor 3 is connected with the output of the hall sensor 2 and the input port of the switching circuit 4, and the other terminals of both coils 5 are respectively linked to the driving ports of the switching circuit 4. In addition, the switching circuit 4 consists of two transistors, two capacitors, and one resistor.

The sensor 2 is an integrated hall-effect sensor, and it senses the magnetic field of the double-coil motor to control the switching circuit 4 for driving both coils 5 of the double-coil motor. Consequently, the double-coil motor rotates the fan of an electric fan. Since there are two coils in the double-coil motor, the magnetic fields generated by both coils disturb each other and noise is consequently induced. In addition, the electric means of the prior art for driving the double-coil motor is complex and costs high. Thus, single-coil motor is developed to improve the disadvantages of the double-coil motor.

SUMMARY OF THE INVENTION

The major objective of the invention is to provide an electric means for driving a single-coil motor.

The other objective of the invention is to provide an electric circuit for absorbing the sudden peak of the voltage induced by the coil of the single-coil motor.

With the problem of the prior art in mind, the electric means of the invention for driving a single-coil motor includes three diodes, a capacitor, and a coil-drive integrated circuit. It is clear that the electric means of the invention is simpler and more compact than the prior art, and its cost is consequently lower. In addition, since there is only one coil in the single-coil motor, it is more noiseless than the prior art.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DETAILED DESCRIPTION OF THE INVENTION

Figure 1:
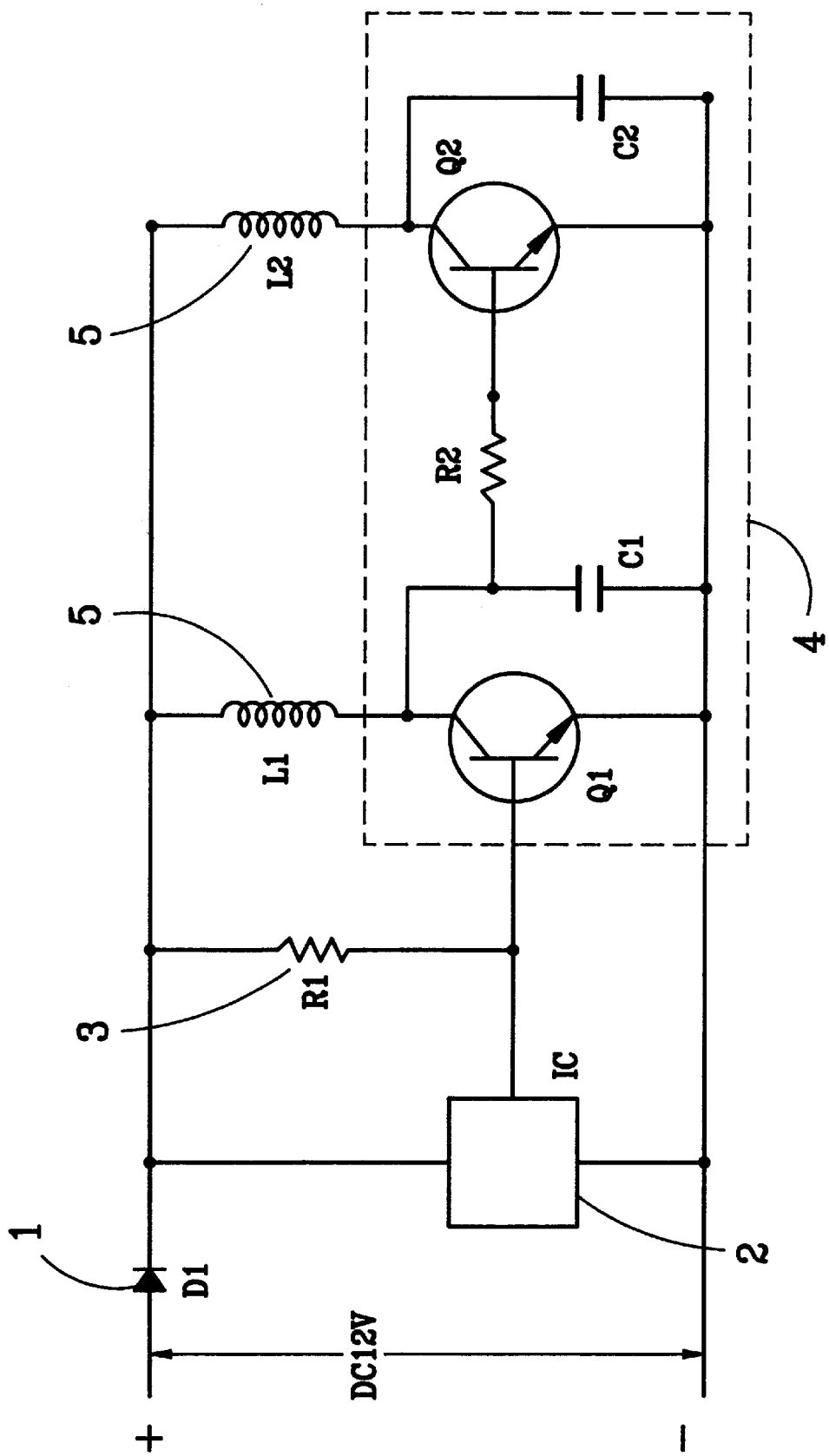
FIG. 1 is an electric means of the prior art for driving a double-coil motor.
Figure 2:
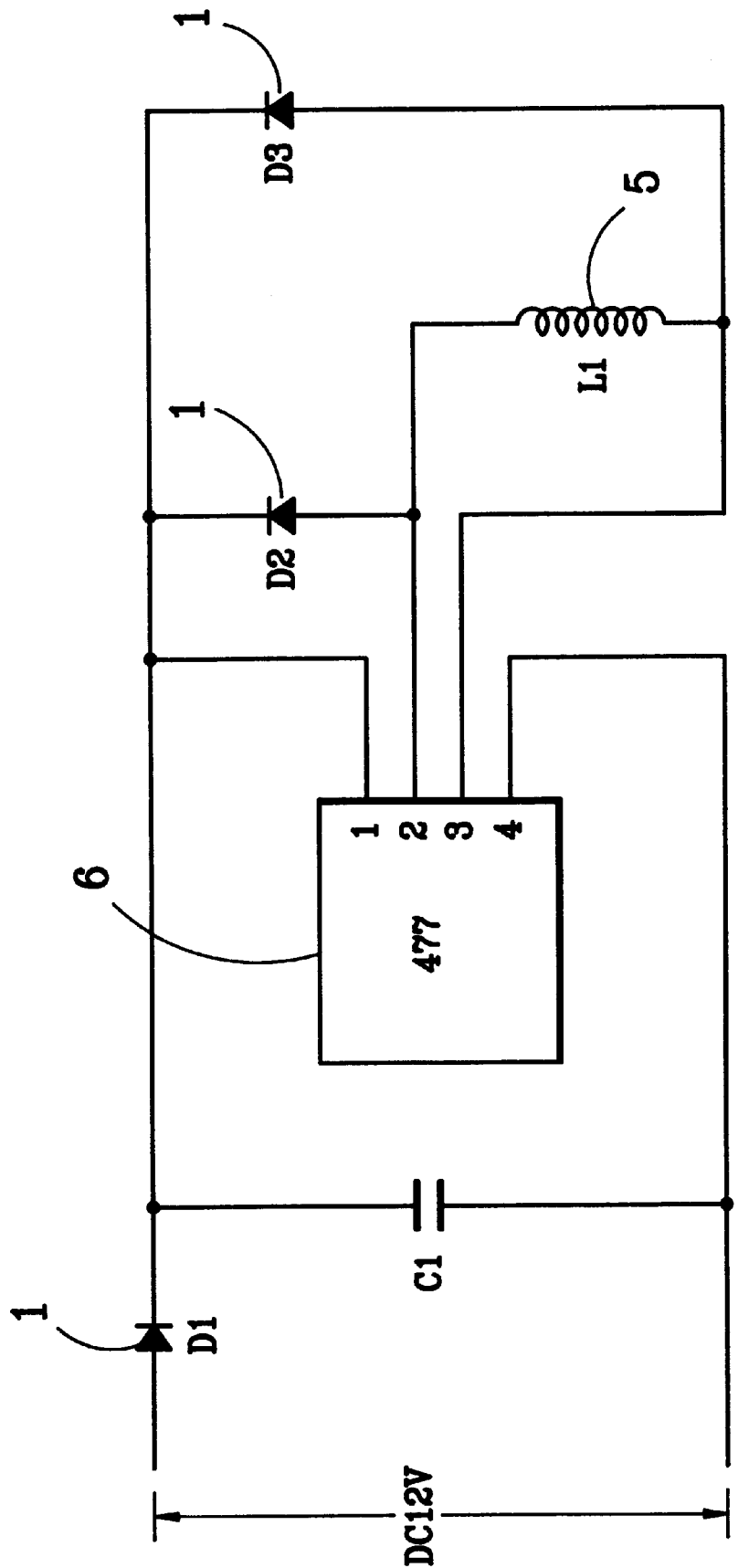
FIG. 2 is an electric means of the invention for driving a single-coil motor.
Figure 3:
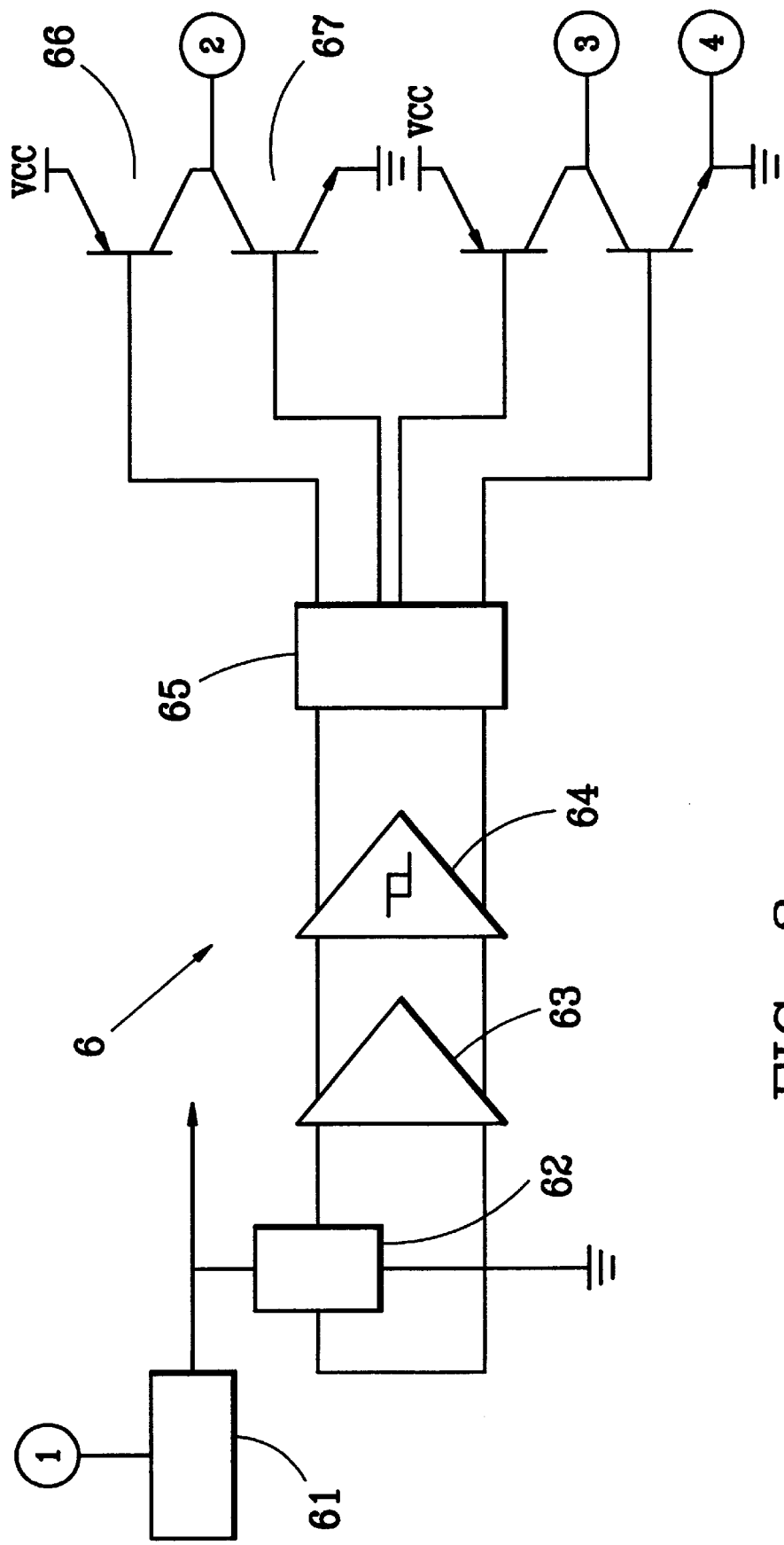
FIG. 3 is the circuit diagram of the coil-drive IC of the electric means shown in FIG. 2.

Please refer to FIG. 2, which is an electric means of the invention for driving a single-coil motor. The electric means of the invention includes three diodes 1, a capacitor C1, and a coil-drive integrated circuit (IC) 6. The diodes 1 are respectively denoted as D1, D2, and D3. The positive terminal of the diode D1 is connected with the positive output port of a DC power source, and the other terminal of the diode D1 is linked to one end of the capacitor C1, the power input ① of the coil-drive IC 6, and the negative terminals of the diodes D2 and D3. The other end of the capacitor C1 and the ground input ④ of the coil-drive IC 6 are connected with the ground output port of the DC power source. The output ② of the coil-drive IC 6 is linked to the positive terminal of the diode D2 and one end of the coil L1 of the single-coil motor, and the other output ③ of the coil-drive IC 6 is linked to the positive terminal of the diode D3 and the other end of the coil L1. FIG. 3 shows the circuit diagram of the coil-drive IC 6, which has an electric regulator 61, a hall-effect sensor 62, a comparison amplifier 63, a smith trigger 64, a temperature compensation circuit 65, and a protection circuit 66. The electric regulator 61 and the temperature compensation circuit 65 are used to offer larger operating ranges of supplied voltage and environment temperature. The hall-effect sensor 62 senses the magnitude and direction of the magnetic field of the single-coil motor, and the comparison amplifier 63 is used to amplify the output signal of the hall-effect sensor 62. The smith trigger 64 is used to enhance the tolerant capability of noise for the amplified signal of the comparison amplifier 63. In addition, the protect circuit 66 is able to prevent the damage of high voltage induced by the coil L1.

The advantages of the electric means of the invention for driving a single-coil motor are that the circuit of the electric means of the invention is simple and compact for facilitating the design of small electric fans, there is only one coil used in the motor to prevent the mutual disturbance of both coils of the double-coil motor, and the diodes D2 and D3 are used to absorb the sudden peak of the voltage induced by the coil of the single-coil motor. It is noted that the electric means for driving a single-coil motor described above is the preferred embodiment of the present invention for the purposes of illustration only, and is not intended as a definition of the limits and scope of the invention disclosed. Any modifications and variations that may be apparent to a person skilled in the art are intended to be included within the scope of the present invention.

What is claimed is:

1. An electric means for driving a single-coil motor, comprising:

a first diode;

a coil-drive integrated circuit with a power input, a ground input, and two outputs; and two second diodes;

whereby the positive terminal of said first diode connected with the positive output port of a DC power source, the other terminal of said first diode linked to the power input of said coil-drive integrated circuit and the negative terminals of said second diodes, the ground input of said coil-drive integrated circuit connected with the ground output port of the DC power source, and the positive terminals of said second diodes and the outputs of said coil-drive integrated circuit respectively linked to both ends of the coil of said single-coil motor.

2. An electric means for driving a single-coil motor, comprising:

a first diode;

a capacitor;

a coil-drive integrated circuit with a power input, a ground input, and two outputs; and two second diodes;

whereby the positive terminal of said first diode connected with the positive output port of a DC power source, the other terminal of said first diode linked to one end of said capacitor, the power input of said coil-drive integrated circuit and the negative terminals of said second diodes, the other end of said capacitor and the ground input of said coil-drive integrated circuit connected with the ground output port of the DC power source, and the positive terminals of said second diodes and the outputs of said coil-drive integrated circuit respectively linked to both ends of the coil of the single-coil motor.

3. The electric means for driving a single-coil motor as defined in claim 2, wherein said coil-drive integrated circuit includes an electric regulator, a hall-effect sensor, a comparison amplifier, a smith trigger, a temperature compensation circuit, and a protection circuit, whereby said electric regulator and said temperature compensation circuit are used to offer larger operating ranges, said hall-effect sensor senses the magnitude and direction of the magnetic field of the single-coil motor, said comparison amplifier is used to amplify the output signal of said hall-effect sensor, said smith trigger is used to enhance the tolerant capability of noise for the amplified signal of said comparison amplifier, and said protect circuit is able to prevent the damage of high voltage induced by the coil of the single-coil motor.

\* \* \* \* \*